US009254858B2

(12) United States Patent
Shellenberger (10) Patent No.: US 9,254,858 B2
(45) Date of Patent: Feb. 9, 2016

(54) COMBINATION DRAG AND PARKING BRAKE FOR A STROLLER

(71) Applicant: ARTSANA USA, INC., Lancaster, PA (US)

(72) Inventor: Mitchell L. Shellenberger, Mount Joy, PA (US)

(73) Assignee: Artsana USA, Inc., Lancaster, PA (US)

( * ) Notice: Subject to any disclaimer, the term of this patent is extended or adjusted under 35 U.S.C. 154(b) by 0 days.

(21) Appl. No.: 14/264,356

(22) Filed: Apr. 29, 2014

(65) Prior Publication Data

US 2014/0345980 A1 Nov. 27, 2014

Related U.S. Application Data

(60) Provisional application No. 61/825,816, filed on May 21, 2013.

(51) Int. Cl.
*B62B 9/08* (2006.01)
*B62B 5/04* (2006.01)

(52) U.S. Cl.
CPC ............... *B62B 9/085* (2013.01); *B62B 9/087* (2013.01); *B62B 5/048* (2013.01); *B62B 5/0461* (2013.01)

(58) Field of Classification Search
CPC .......... B62B 9/08; B62B 9/085; B62B 9/087; B62B 5/048; B62B 5/0461
USPC .............. 188/19, 20, 21, 24.14, 24.15, 24.22, 188/77 R, 77 W, 2 D, 2 F, 68; 280/47.24, 280/47.34, 47.38, 642
See application file for complete search history.

(56) References Cited

U.S. PATENT DOCUMENTS

| | | | |
|---|---|---|---|
| 5,370,408 A | 12/1994 | Eagan | |
| 6,142,264 A | 11/2000 | Lin | |
| 6,298,949 B1 | 10/2001 | Yang et al. | |
| 6,341,672 B1 * | 1/2002 | Yang | B62B 9/087 188/20 |
| 6,382,364 B1 | 5/2002 | Chuang | |
| 6,488,130 B1 | 12/2002 | Bermel | |
| 6,817,451 B1 | 11/2004 | Chen | |
| 7,222,874 B1 * | 5/2007 | Liu | B60T 7/102 188/19 |
| 7,571,966 B2 | 8/2009 | Chen et al. | |
| 7,735,843 B2 | 6/2010 | Dotsey et al. | |
| 7,815,019 B2 | 10/2010 | Chen et al. | |
| 8,316,999 B2 * | 11/2012 | Solinski et al. | 188/20 |
| 8,333,393 B2 | 12/2012 | Geeslin | |
| 2004/0144600 A1 * | 7/2004 | Ikegami | A61G 5/1027 188/2 F |
| 2007/0007089 A1 * | 1/2007 | Silberman | B62B 5/04 188/2 D |
| 2008/0047785 A1 * | 2/2008 | Huang | A61H 3/04 188/24.18 |
| 2009/0139805 A1 * | 6/2009 | Santamaria | 188/20 |
| 2009/0194373 A1 * | 8/2009 | Liljedahl | A61H 3/04 188/24.21 |
| 2011/0089665 A1 * | 4/2011 | Schneider | B60T 7/104 280/304.1 |
| 2012/0007341 A1 | 1/2012 | Masaki | |
| 2012/0090926 A1 * | 4/2012 | Dunlap | A61H 3/04 188/68 |

* cited by examiner

*Primary Examiner* — Anna Momper
*Assistant Examiner* — San Aung
(74) *Attorney, Agent, or Firm* — Andrew D. Mead (57) ABSTRACT

A braking mechanism for a stroller having a parking brake which prevents rotation of a wheel and a drag brake which retards rotation of the wheel, the braking mechanism being controlled by a single brake lever. The lever has a neutral position in which neither the parking brake nor the drag brake is engaged and the wheel rotated freely, a parking position in which the parking brake is engaged, and a drag braking position in which a use can apply and modulate the drag brake to selectively retard wheel rotation. The combination braking mechanism is preferred for use on a conventional jogging stroller.

14 Claims, 10 Drawing Sheets

COMBINATION DRAG AND PARKING BRAKE FOR A STROLLER

CROSS REFERENCE TO RELATED APPLICATIONS

This application claims the benefit of priority of U.S. Provisional Application 61/825,816, filed May 21, 2013.

BACKGROUND OF THE INVENTION

The present application relates generally to the field of wheeled strollers for children. More particularly, the present invention relates to a braking mechanism for a jogging stroller that includes both a parking brake and a friction drag brake integrated into a wheel hub carrier and selectively operated by a single user control lever.

Jog strollers for transporting babies and young children are well known in the art. Such strollers typically include three wheels of larger diameter, often 20 to 40 cm in diameter, that are more suitable for higher travel speeds over sometimes less than smooth surfaces. Many jog strollers conveniently include a drag braking mechanism that can be operated by a user via a convenient hand lever positioned on the stroller handlebar. Often such brakes are simple cable actuated caliper brakes sourced from the bicycle field acting on the rim of one or more of the stroller wheels and include a lever disposed on the stroller handle. Strollers are also provided with a parking brake means for preventing one of more of the wheels from rotating when the parking brake is engaged. Parking brake actuation is typically engaged (prevents wheel rotation) or disengaged (allows wheel rotation) and often incorporated into wheel mounting hubs.

Design simplification continues to drive innovation in strollers. A braking mechanism for a jog stroller capable of both modulated braking and a parking brake function would provide great benefit. Additional advantages would be realized by a braking mechanism incorporating a single user control interface allowing both modulated drag braking and engagement/disengagement of the parking brake.

SUMMARY OF THE INVENTION

According to one embodiment of the present invention, a stroller having collapsible frame including at least one forwardly disposed front wheel, a pair of rearwardly disposed, transversely spaced-apart rear wheels, and an upwardly extending handle support terminating in one or more handles at the upper end thereof is provided. The rear wheels are connected to the frame by right and left side hub connector assemblies. Each hub connector assembly includes an axle on which the wheel is mounted and a braking mechanism for retarding or preventing rotation of the wheel. The braking mechanism includes a wheel hub having a braking surface and a locking surface, a moveable friction element arranged adjacent to the braking surface, the friction element being moveable from a release position in which the friction element and braking surface are not in contact, and a braking position in which the friction element and braking surface are in adjacent contact, and a locking element also moveable between generally opposing locked and released positions arranged to engage the locking surface when in the locked position to prevent rotation of the wheel.

An actuator mechanism is provided and operably connected to the braking mechanism, the actuator mechanism having a locked position which moves the locking element in to the locked position, a neutral position in which the locking element and the friction element are in their respective release positions, and a braking position which moves the friction element into the braking position and allows for modulation of the force with which the friction element contacts the braking surface. The mechanism is preferably biased toward the locked position in which the locking element is engaged to prevent rotation of the wheel. A user-selectable release mechanism maintains the actuator in the neutral position against the biasing force enabling wheel movement. Movement of the actuator mechanism toward the braking position engages the friction element on the braking surface and allows variable braking force to be applied.

Additional advantages and objectives of various aspects and embodiments of the present invention are discussed below.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "up" or "down," "right" or "left," or "top" or "bottom" are used as a matter of mere convenience, and are determined as the stroller would normally be pushed by a user across the floor or a similarly level surface while in an operating position. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Furthermore, when referring to the figures, like parts are numbered the same in all of the figures. Inclusion of an "R" or an "L" designation in conjunction with a reference number signifies an item shown on the right or left side of the stroller, respectively. Use of the reference number sans "R" or an "L" designation refers to the item generically without regard to a particular orientation.

Figure 1:
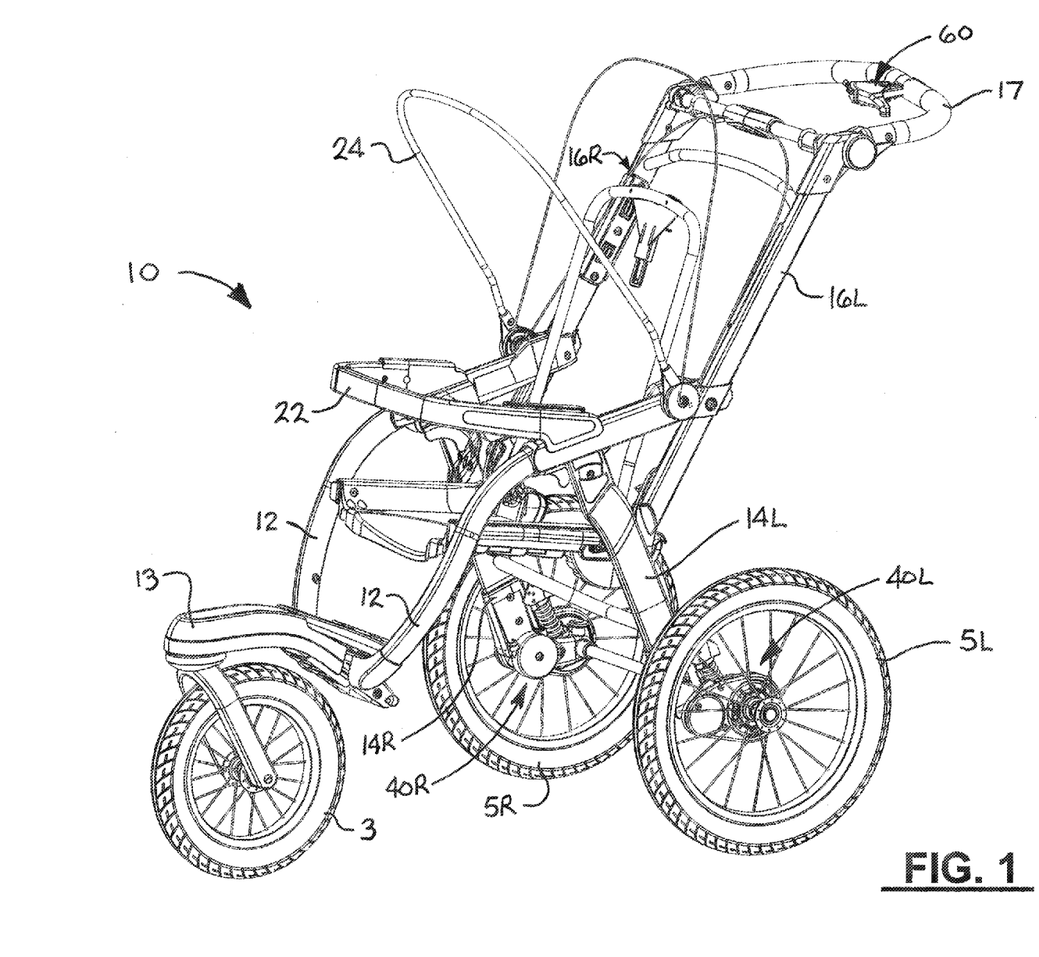
FIG. 1 is a perspective view of the frame of a known jog stroller of the type on which the present invention is useful.
Figure 2:
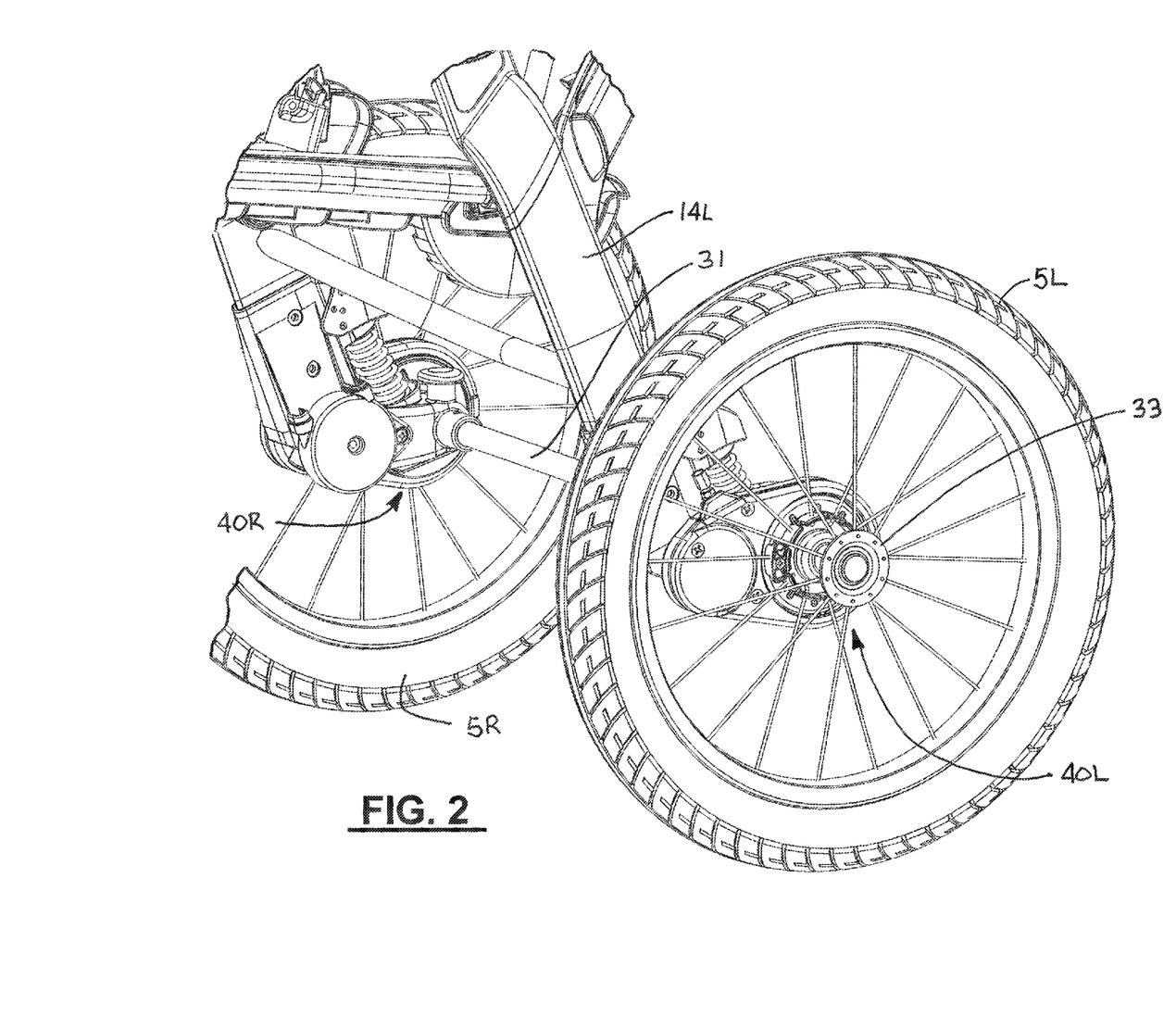
FIG. 2 is a partial view of the stroller frame of FIG. 1 showing a braking mechanism incorporating one embodiment of the present invention.
Figure 3:
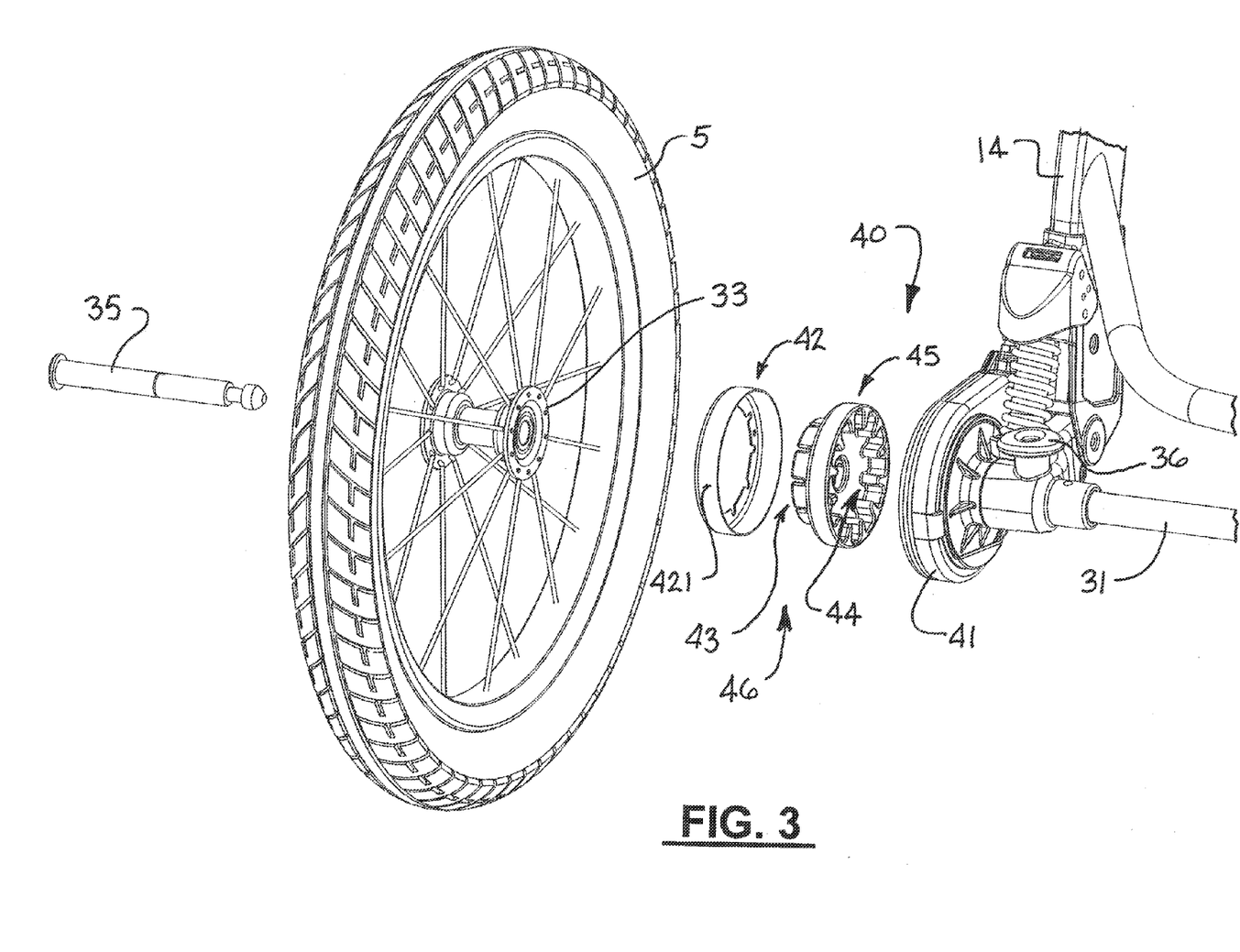
FIG. 3 is a partial exploded view of the braking mechanism of FIG. 2.
Figure 4:
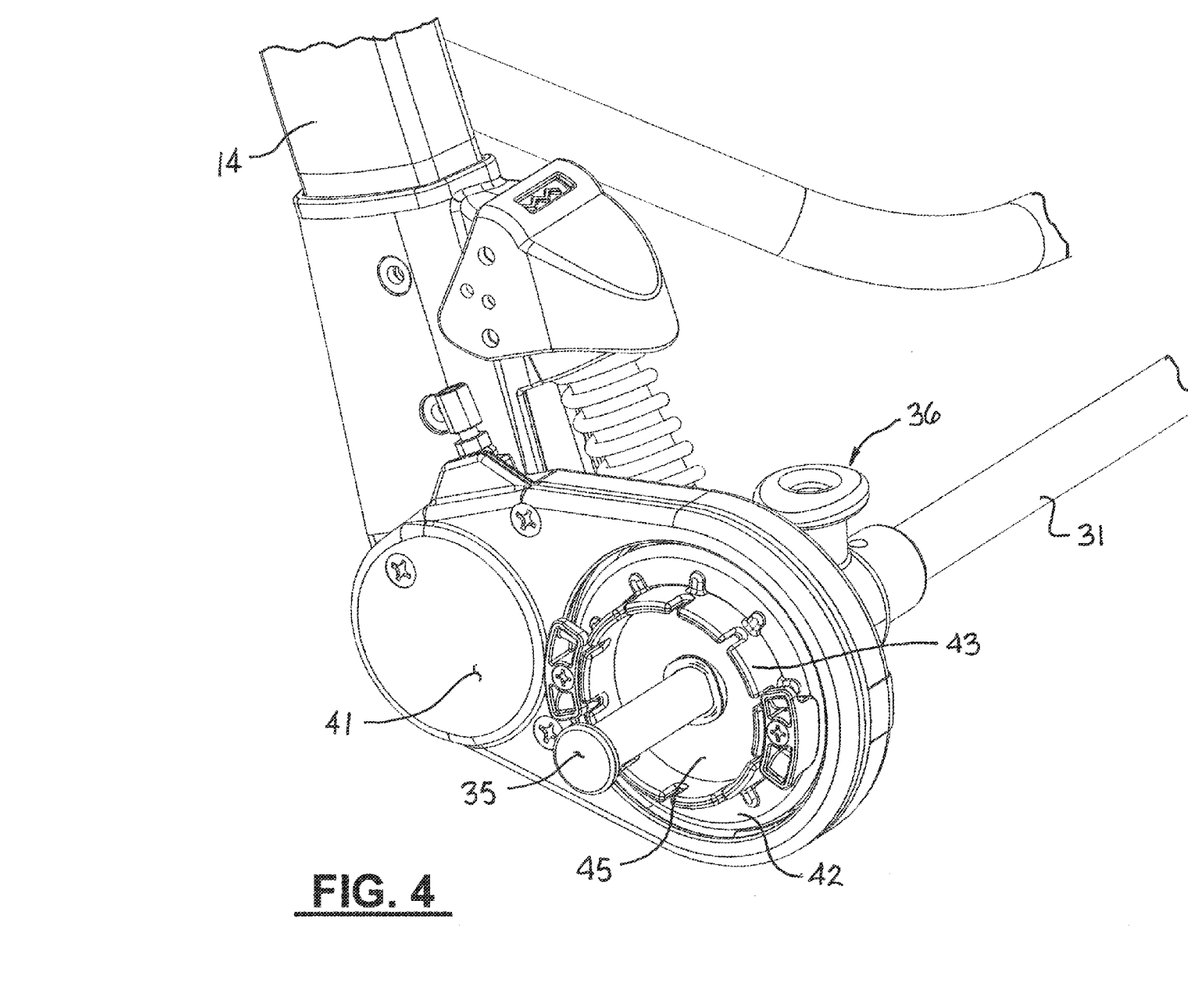
FIG. 4 is a partially disassembled view of the braking mechanism of FIG. 2.
Figure 5:
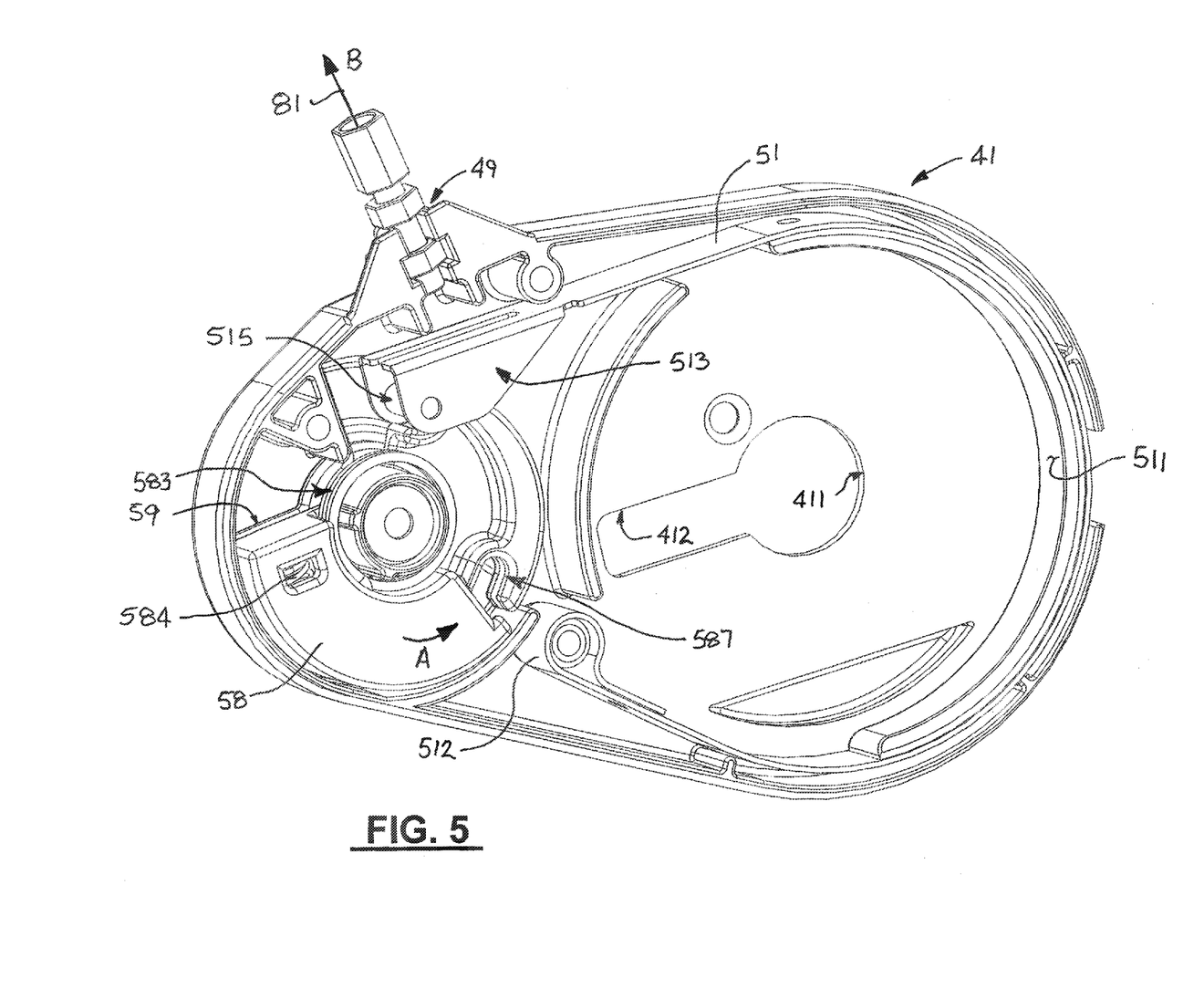
FIG. 5 is a view of the housing for the braking mechanism of FIG. 2.
Figure 6:
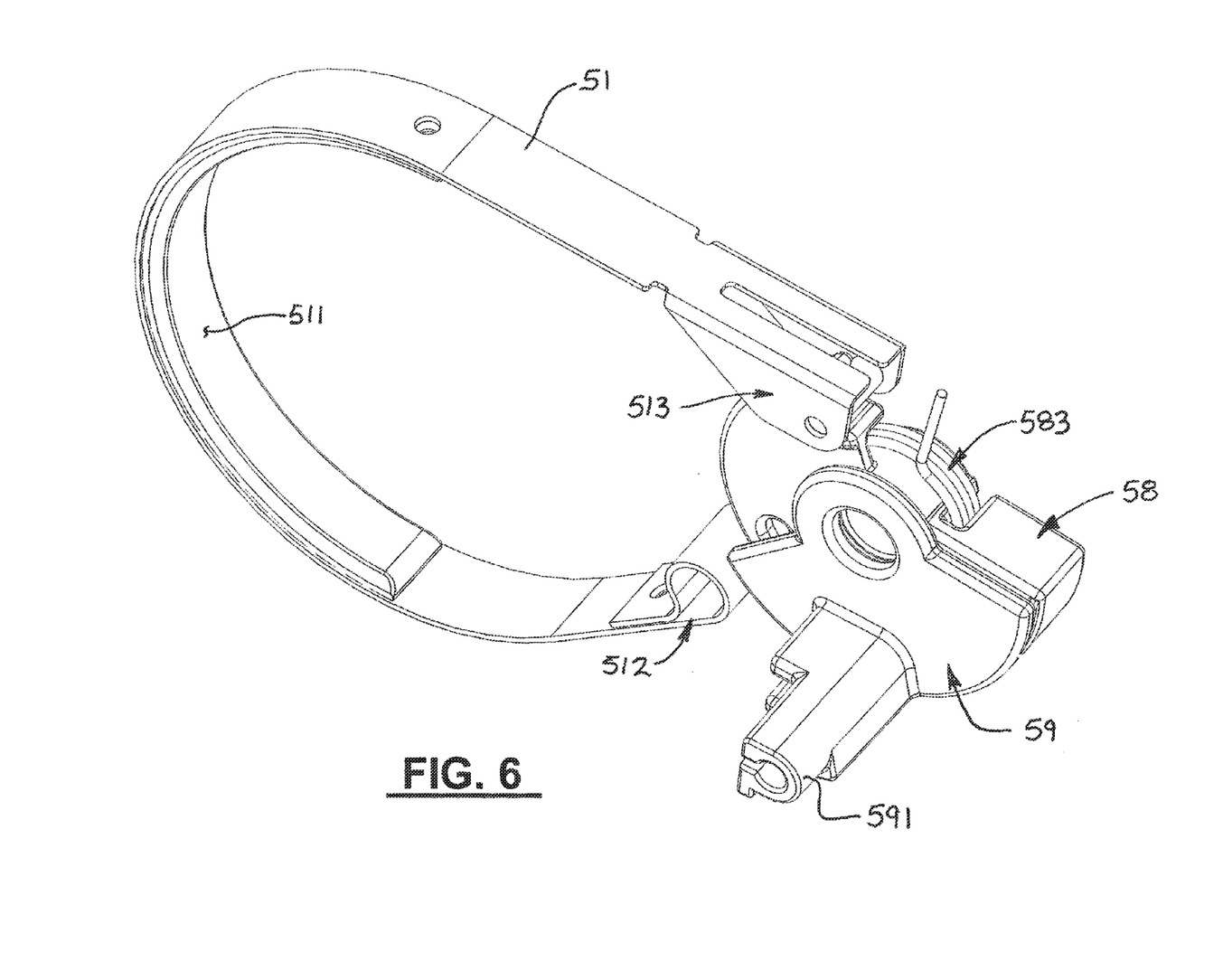
FIG. 6 is a partial view of the internals of the braking mechanism of FIG. 2.
Figure 7:
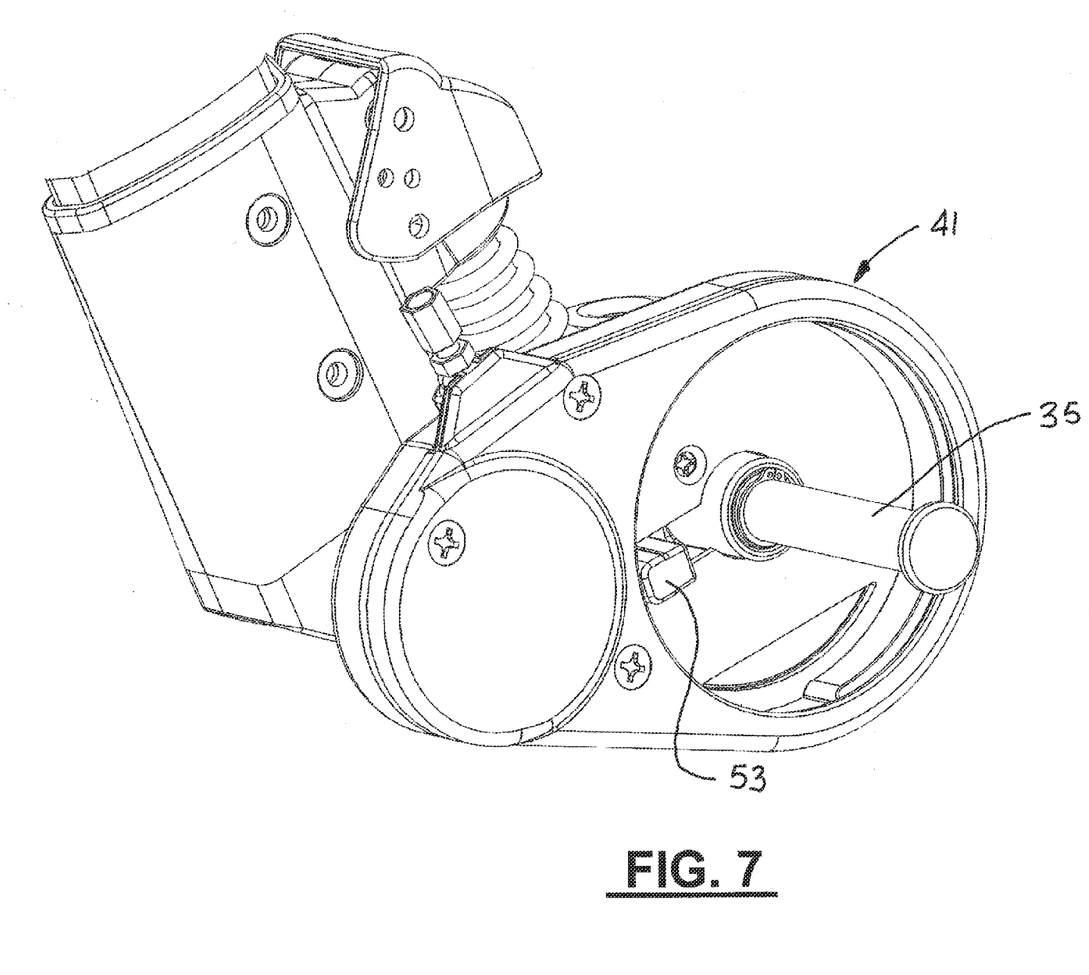
FIG. 7 shows the one embodiment of a parking brake locking lug used in the present braking mechanism with the lug shown in the engaged position.
Figure 8:
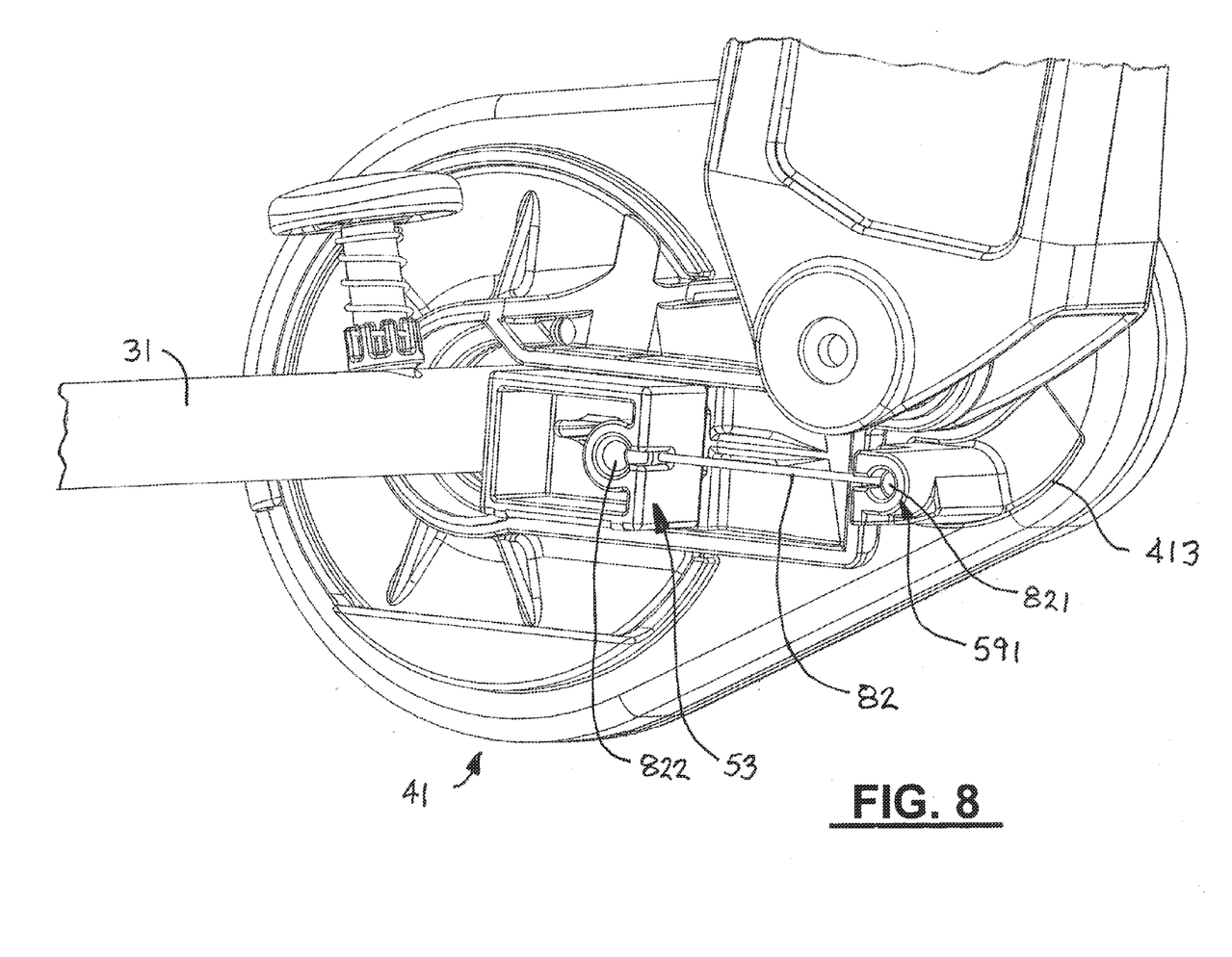
FIG. 8 shows a partial rear view of the braking mechanism housing with the actuator means for the parking lug illustrated when the parking lug is in the disengaged position.
Figure 9:
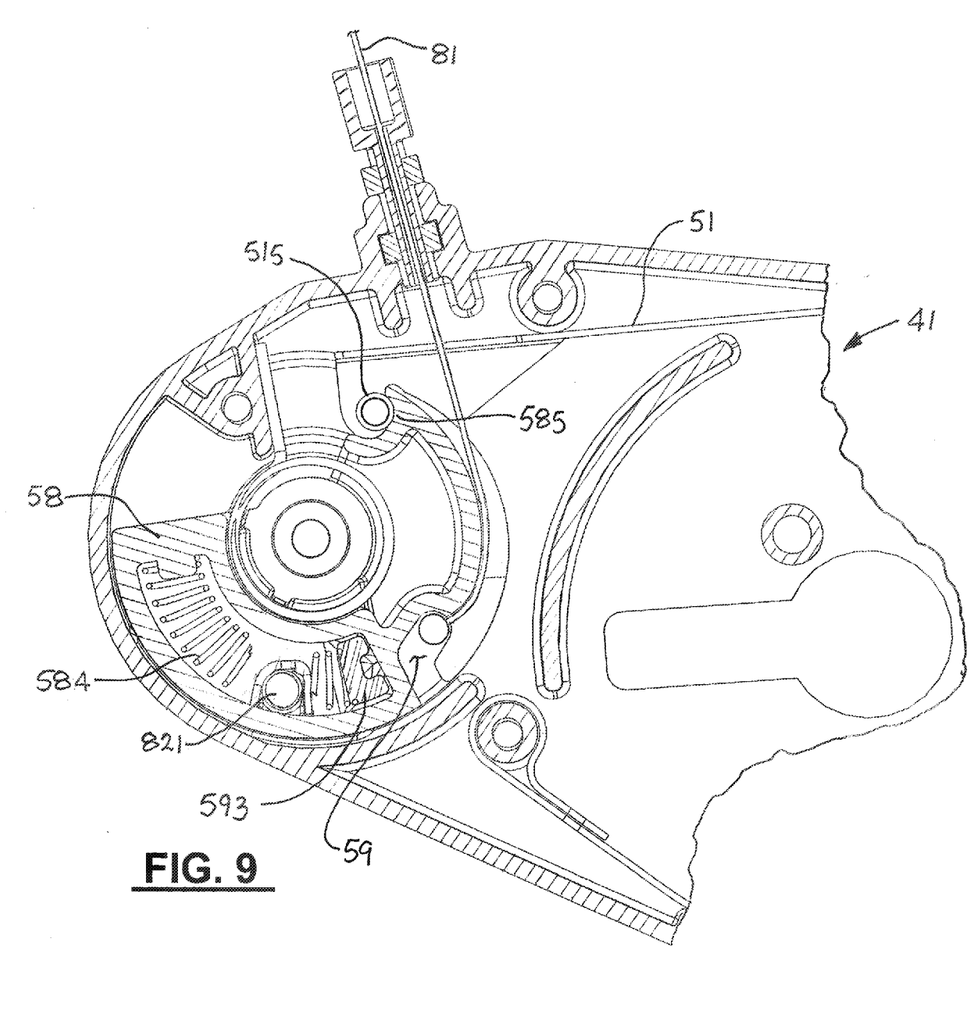
FIG. 9 is a partial section view of the brake mechanism showing a cutaway view of the braking actuator.

Referring to FIG. 1, a foldable jog stroller frame 10 is shown comprising a forwardly extending front wheel support 12 with at least one forwardly disposed wheel connector 13 and a front wheel 3 connected thereto, rearwardly extending right and left side rear wheel supports 14R, 14L with rearwardly disposed wheel connector and braking mechanism housings 40L, 40R with left and right wheels 5L, 5R connected thereto, and upwardly extending right and left side handle supports 16R, 16L terminating in one or more handles 17 at the upper end. A seat assembly 20, confinement bar 22 and cover supports 24 may also be provided as is common practice. The front wheel supports, rear wheel supports and handle supports are preferably hingedly connected in a manner enabling the stroller frame to be collapsed from the operable position shown in FIG. 1 to a more compact configuration for stowage as is common in the art.

As is best illustrated in FIGS. 2 through 9, the wheel connectors 40L, 40R support a rear axle shaft 31, connecting the rear axle to the stroller frame thereby increasing stability and strength of the frame. Rear wheels 5 include a central hub 33 which engages the axle 31, either by direct connection thereto, or preferably though the use of axle pins 35 configured to releasably engage the axle 31. Pin releases 36 are provided to allow the axle pins 35 to be selectively removed thereby allowing the rear wheels to be easily removed for compact stowage of the stroller. Alternate embodiments eliminate axle 31 and include axle pin 35 connections directly to the wheel connectors 40.

Each braking mechanism 40 further includes a housing 41 containing a friction band 51 and a locking lug element 53, both which are moveable. Openings 411 and 412 are provided to enable the housing to fit over the axle 31 and permit movement of internal components. A rotating braking element assembly 46 comprising a parking brake hub 45 and a friction hub 42 is arranged for rotation about the axle 31 (or axle pin 35). Parking brake hub 45 and friction hub 42 may also be combined in a single element; separate elements provides flexibility in material selection as the outer surface 421 frictionally engages friction material 511 lining a portion of the internal surface of friction band 51 to provide the drag braking function. The friction hub 42 preferably comprises a generally cylindrical surface centered about the axle 31 and partially encircled by the friction band 51. The parking brake hub 45 further includes a plurality of engagement tabs 43 which project axially toward the wheel 5 and engage the wheel so that the wheel 5 and brake hub 45 rotate in unison. In the embodiment illustrated, the wheel 5 is a spoked wheel and the tabs 43 include indentations to engage the spokes in a manner preventing relative rotational movement between the brake hub 45 and the wheel 5. The tabs 43 also engage friction hub 42 so that it, too, rotates in unison with the wheel 5 and the brake hub 45.

Brake hub 45 further includes a locking surface comprising plurality of indentation structures 44 which are radially arranged about the axle axis. A moveable locking element 53 may be selectively engaged with one of the indentation structures 44 by linear movement of the lug toward the locking surface. When so engaged, the locking lug element 53 prevents rotational movement of the braking hub 45 and thus the wheel 5 to provide a parking brake/lock function for the stroller.

The internal mechanism for the braking mechanism 40, best shown in FIGS. 5 through 9, is mounted to the housing 41 and includes friction band 51, brake rocker element 58 and locking rocker element 59. Braking and rocker elements 58, 59 are pivotally connected to the housing 41. While shown as separate elements to permit differing degrees of rotation between the elements, the rocker elements 58, 59 may also be integrated into a single rocker element. The friction band 51 is connected to the housing at a first end 512. Second end 513 includes a connector 515 which is engaged in a receiver 585 on the braking rocker element 58 which allows the friction band to be selectively constricted or released from around the friction hub 42 as the rocker element 58 is moved from a neutral position toward a braking position (direction arrow "A" in FIG. 5). Self-energizing braking is possible by orienting the second end to extend tangentially from the brake hub in the direction of rotation. An actuator cable 81 is directed into the housing 41 at cable stop 49 and connects to the brake rocker element 58 at hook 587. Tension in the actuator cable 81 causes movement in the direction shown as arrow "B" which rotates braking rocker element 58 in the braking direction shown as arrow "A" (FIG. 5) to apply the drag brake. A spring 583 is used to bias the rocker elements, 59 58 toward the parking lock position (opposite to the direction of arrow "A").

An intermediate stop in the lever actuator 60, connected by the actuator cable 81, maintains the rockers 58, 59 in a neutral position in which the friction band 51 is disengaged from the friction hub and the locking lug element 53 is disengaged from the locking surface 44, allowing the respective wheel to rotate freely. Release of the intermediate stop in the lever actuator 60 allows the rockers to continue rotating opposite of direction "A" to engage the locking element 53 while leaving the friction band 51 in a non-braking position. Returning the lever 60 to the intermediate position withdraws the locking lug element 53 from engagement with the locking surface 44 so that the wheel may rotate. Further movement of the lever in the braking direction (opposite of the direction to engage the parking brake) rotates the braking rocker element 58 and constricts the friction band 51 on the outer surface 421 to apply the braking force. In the embodiment shown, the degree to which locking rocker element 59 may rotate in the braking direction (arrow "A") is limited. A differential spring 584 is provided to enable additional rotation of the brake rocker element 58 in the braking direction even as the locking rocker element 59 rotation in that direction may be limited.

Connector post 591 extends from the locking rocker element 59 through parking aperture 413 to the exterior of housing 41 to provide a convenient connection for a first connector end 821. Connector cable 82 is directed to second connector end 822 which engages the locking element 53. Movement of the locking rocker element 59 and braking rocker element 58 by the connector cable 82 is independent as the actuator cable 81 is moved in to apply the drag brake, shown as arrows "A" and "B" in FIGS. 5 and 6. Detensioning the actuator cable 81 (movement in direction opposite to arrow "B") allows the rocker elements 58, 59 to move in the opposite direction of "A", releases the friction band 51, and causes, by connector cable 82, the locking element 53 to move outwardly in relation to the axle centerline to engage the locking surface 44 of the braking hub 45. A spring or the like interposed between rocker elements 58, 59 allows the braking rocker element 58 and locking rocker element 59 to move independently, such as is necessary to allow the braking rocker element 58 to move in the direction "A" without moving the locking rocker element 59.

Figure 10:
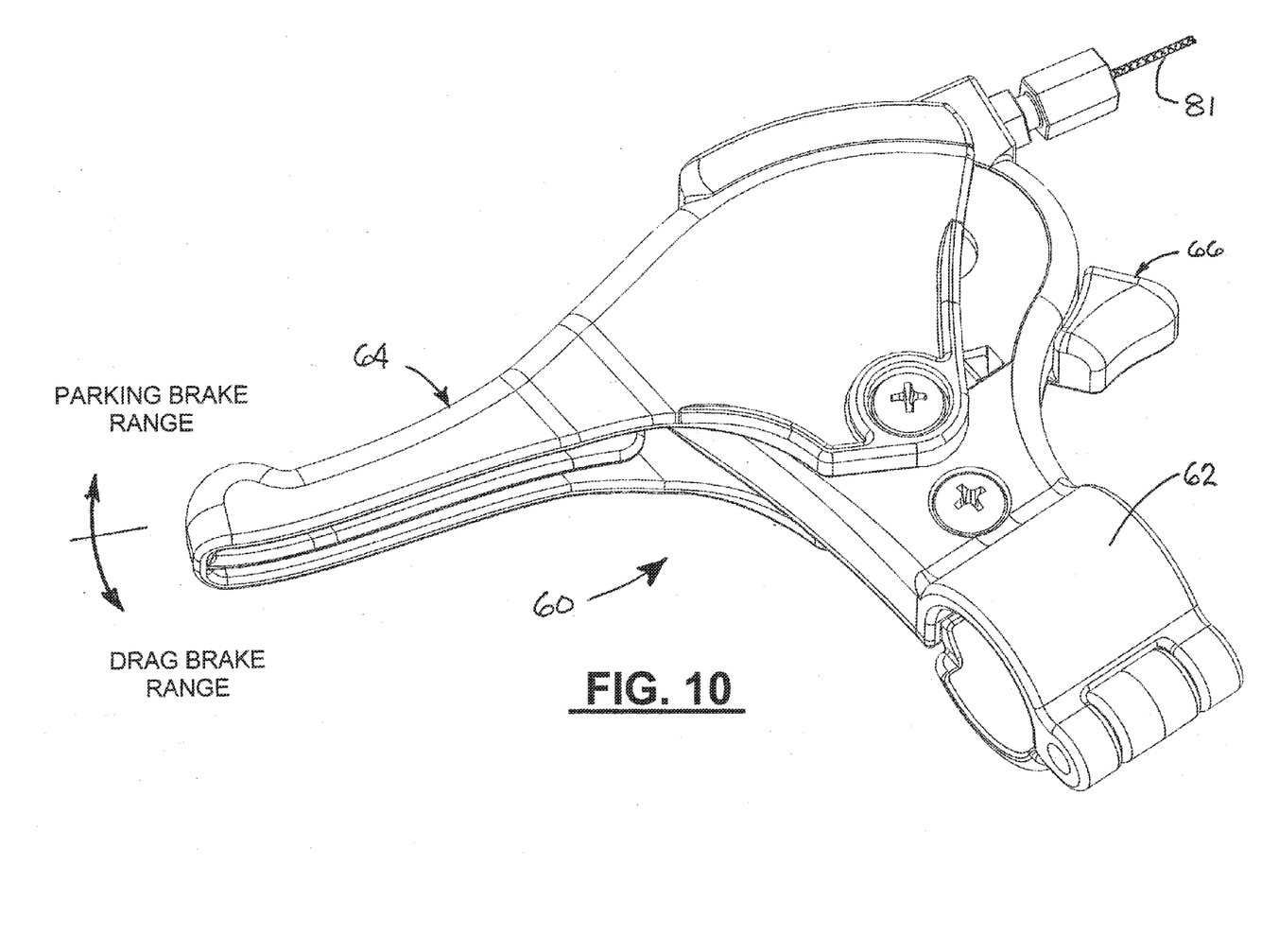
FIG. 10 illustrates a control lever for managing the operation of the braking mechanism shown in FIGS. 2-9.

Drag braking and parking brake functions are managed by a single cable-actuated input actuated by a lever operator 60, shown in FIG. 10, which controls movement of rocker elements 58, 59 via the connection to the brake rocker element hook 587 of actuator cable 81. Lever operator 60 includes a mount 62 for conveniently attaching the operator to the handles 17 or other suitable location on the stroller frame and a lever 64. The lever 64 is positionable in two distinct ranges of operation. A first range engages the parking brake function while the second range enables actuation of the drag brake function. The lever 64 is preferably biased toward the locked position by biasing elements positioned (spring 583) in the braking mechanism. A locking mechanism including a release 66 with a lock and a release position provides a releasable intermediate stop position for the lever 64 as well as a safety lock to prevent inadvertent release of the parking brake. When released, the biasing spring 583 positions the rockers 58, 59 and the lever 64 so that the locking element 53 is fully engaged with the locking surface 44 to prevent wheel rotation for the parking brake function. The locking mechanism reengages to maintain the lever 60 in the parking brake position. Moving the release button 66 to the release position while the parking brake is engaged allows the lever to be moved to the neutral position, tensioning the actuator cable 81 and moving the rocker 58, 59 into their respective neutral positions. Allowing the release button 66 to return to the locked position while the lever is in the neutral position retains the lever in the intermediate neutral position (as shown in FIG. 10) in which the locking element 53 is disengaged from the locking surface 44 and the friction band 51 is not brakingly engaged on the braking surface 42. From the neutral position, the lever 64 can be moved against the bias element into the drag braking range to apply braking force via engagement of the friction band 51 with the braking surface 42 and allow a user to decelerate the stroller. The locking mechanism remains locked to prevent movement of the lever 60 into the parking brake range. Movement of the lever within this drag braking range varies the braking force applied thereby enabling a use to modulate the braking for the stroller.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

I claim:

1. A braking mechanism for a stroller comprising:
   a housing;
   a hub rotatably connected to the housing and having a wheel connected thereto for rotation therewith about an axle axis;
   an actuator disposed within the housing having a first portion and a second portion each independently rotatable about a common axis in generally opposing first and second directions, the first portion moveable in the first direction from a parking position to a neutral position, the second portion moveable in the first direction from the parking position to a braking position, the braking position being further rotationally displaced in the first direction than the neutral position;
   a control lever operably connected to the actuator to move the first and second portions in at least the first direction;
   a parking lug moveable by first portion movement in the first direction from the parking position wherein the lug engages the hub to prevent rotation thereof toward the neutral position wherein the lug allows rotation of the hub; and
   a drag brake moveable by second portion movement in the first direction from the parking position wherein the drag brake does not resist rotation of the hub, through the neutral position wherein the drag brake does not resist rotation of the hub, toward the braking position wherein the drag brake resists rotation of the hub.

2. The braking mechanism of claim 1, wherein the first and second portions are rotatable connected by a differential element enabling a greater degree of rotation of the second portion than the first portion.

3. The braking mechanism of claim 2, wherein the differential element is a spring.

4. The braking mechanism of claim 2, wherein the control lever is operably connected to the second portion, rotational movement of the first portion being caused by the differential element.

5. The braking mechanism of claim 4, wherein the control lever is operably connected to the second portion by a cable.

6. The braking mechanism of claim 1, wherein the hub further comprises a generally cylindrically shaped braking surface and the drag brake comprises a friction band partially surrounding the braking surface, the friction band being connected at one end to the housing and to the actuator at an opposite second end, movement of the actuator in the braking direction causing the friction band to be tightened against the braking surface to arrest rotation of the hub.

7. The braking mechanism of claim 6, wherein the common axis is generally parallel to the axle axis.

8. In a stroller for a child having a forwardly extending front leg supporting a front wheel, a pair of rearwardly extending rear legs each supporting a rear wheel, and an upwardly extending handle, the improvement in a braking mechanism comprising:
   a hub connected to each rear leg and having one of the respective rear wheels connected thereto for rotation therewith about an axle axis;
   an actuator disposed adjacent to the hub having a first portion and a second portion each independently rotatable about a common axis in generally opposing first and second directions, the first portion moveable in the first direction from a parking position to a neutral position, the second portion moveable in the first direction from the parking position to a braking position, the braking position being further rotationally displaced in the first direction than the neutral position;
   a parking lug moveable by first portion movement in the first direction from the parking position wherein the lug engages the hub to prevent rotation thereof toward the neutral position wherein the lug allows rotation of the hub;
   a drag brake moveable by second portion movement in the first direction from the parking position wherein the drag brake does not resist rotation of the hub, through the neutral position wherein the drag brake does not resist rotation of the hub, toward the braking position wherein the drag brake resists rotation of the hub; and a handle-mounted control lever operably connected to the actuator to move the first and second portions in at least the first direction.

9. The improvement of claim 8, wherein the the common axis is generally parallel to the axle axis.

10. The improvement of claim 9, wherein the actuator is biased toward movement in the parking direction.

11. The improvement of claim 10, wherein the first and second portions are rotatable connected by a differential element enabling a greater degree of rotation of the second portion than the first portion.

12. The improvement of claim 11, wherein the differential element is a spring.

13. The improvement of claim 12, wherein the control lever is operably connected to the second portion by a cable.

14. The improvement of claim 12, wherein the control lever is operably connected to the second portion, rotational movement of the first portion being caused by the differential element.

* * * * *